(No Model.) 4 Sheets—Sheet 1.

C. KELLER.
APPARATUS FOR CUTTING AND SPREADING GLUE.

No. 482,042. Patented Sept. 6, 1892.

Witnesses.
W. R. Edilew
J. N. Cooke

Inventor
Charles Keller
By James J. Kay
Attorney

THE NORRIS PETERS CO., PHOTO-LITHO., WASHINGTON, D. C.

(No Model.) 4 Sheets—Sheet 4.

C. KELLER.
APPARATUS FOR CUTTING AND SPREADING GLUE.

No. 482,042. Patented Sept. 6, 1892.

Witnesses.
W. R. Edelen,
J. N. Cooke

Inventor
Charles Keller
By James I. Kay
Attorney

UNITED STATES PATENT OFFICE.

CHARLES KELLER, OF SPRINGDALE, PENNSYLVANIA.

APPARATUS FOR CUTTING AND SPREADING GLUE.

SPECIFICATION forming part of Letters Patent No. 482,042, dated September 6, 1892.

Application filed May 22, 1891. Serial No. 393,738. (No model.)

*To all whom it may concern:*

Be it known that I, CHARLES KELLER, a resident of Springdale, in the county of Allegheny and State of Pennsylvania, have invented a new and useful Improvement in Apparatus for Cutting and Spreading Glue; and I do hereby declare the following to be a full, clear, and exact description thereof.

My invention relates to an improvement in apparatus for cutting and spreading glue, and has a general relation to certain patents granted to me, jointly with John Conly, embodying this art—namely, Letters Patent No. 407,865, dated July 30, 1889, and No. 452,075, dated May 12, 1891.

The object of the present invention is to provide for the cutting and spreading of glue on a very large scale by the employment of a form of apparatus in which the blocks of glue fed thereto are conveyed automatically from one cutter to another to be reduced to sheets by a continuous process, the sheets as they are cut arranging themselves in regular order on the drying-nets preparatory to being placed within the drying-kilns.

My invention consists, generally stated, in a series of carriers arranged one in front of the other for conveying the glue blocks, cutting-wires arranged above each carrier in the path of the glue block and adapted to cut a sheet from the lower face thereof, and rollers traveling in the opposite direction from said carriers and acting to depress the sheets as they are cut from said blocks and carry them down beneath said rollers onto the drying-nets.

It also comprises certain improvements in the arrangement and regular distribution of the sheets as they are cut upon the drying-nets and certain other details of construction, all of which will be hereinafter fully set forth and claimed.

To enable others skilled in the art to make and use my invention, I will describe the same more fully, referring to the accompanying drawings, in which—

Figure 1:
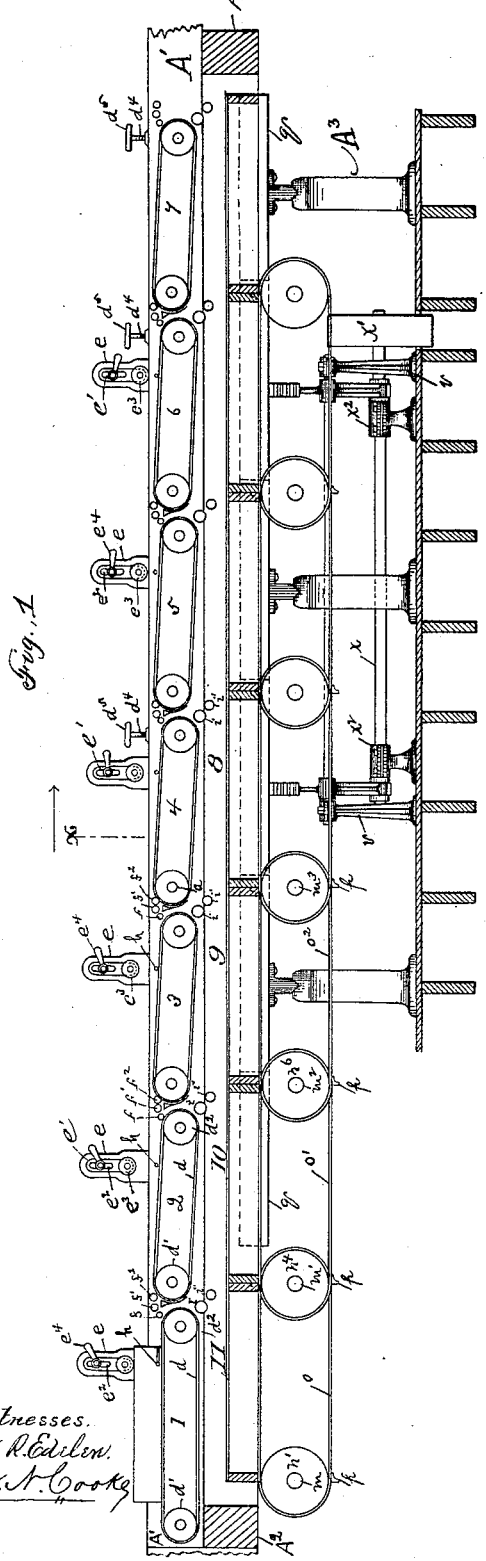
Figure 2:
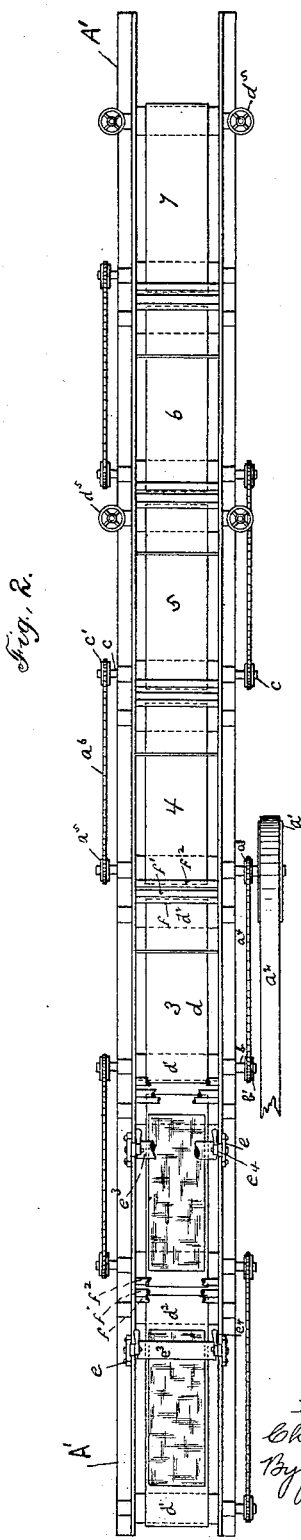
Figure 3:
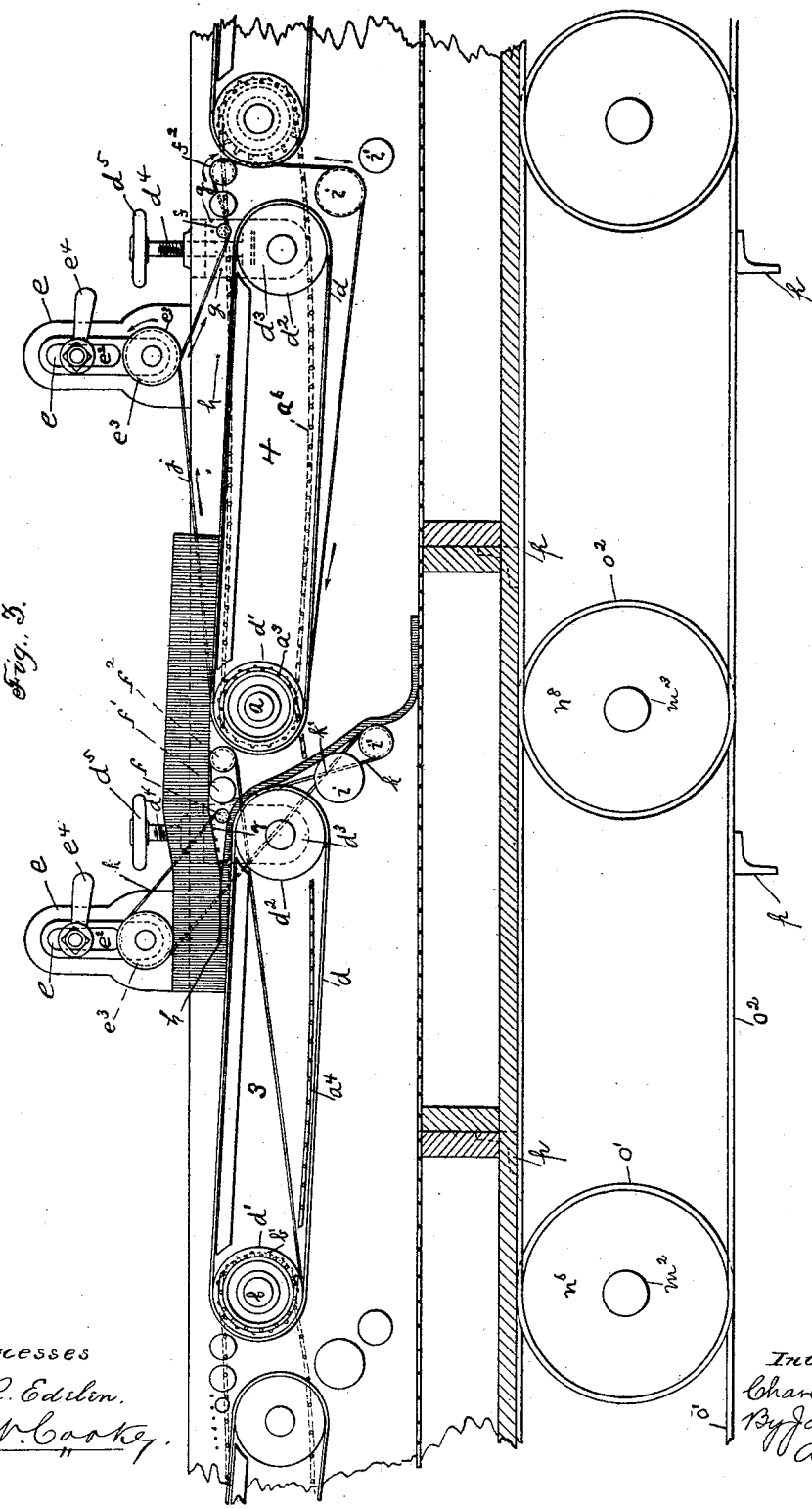
Figure 4:
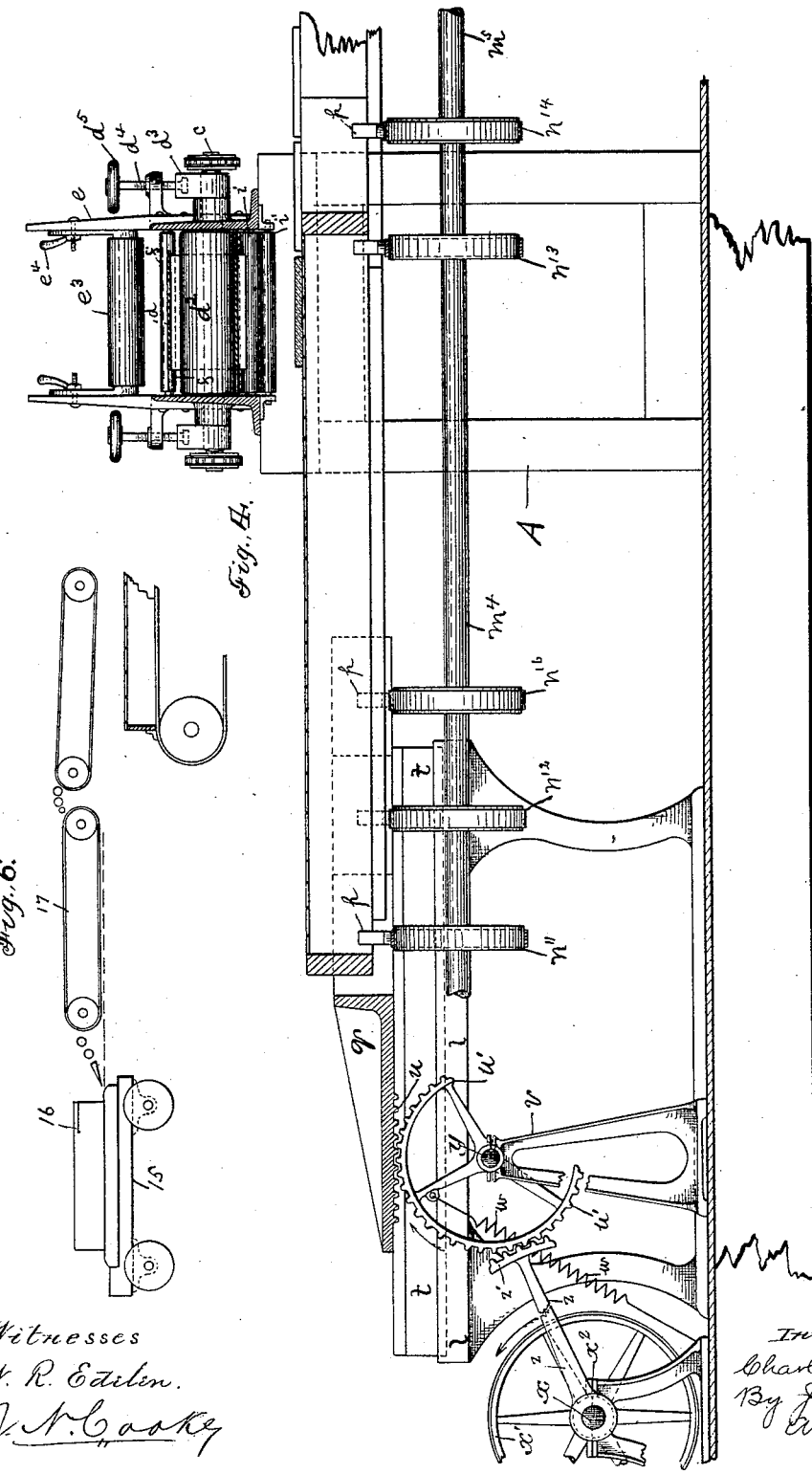
Figure 5:
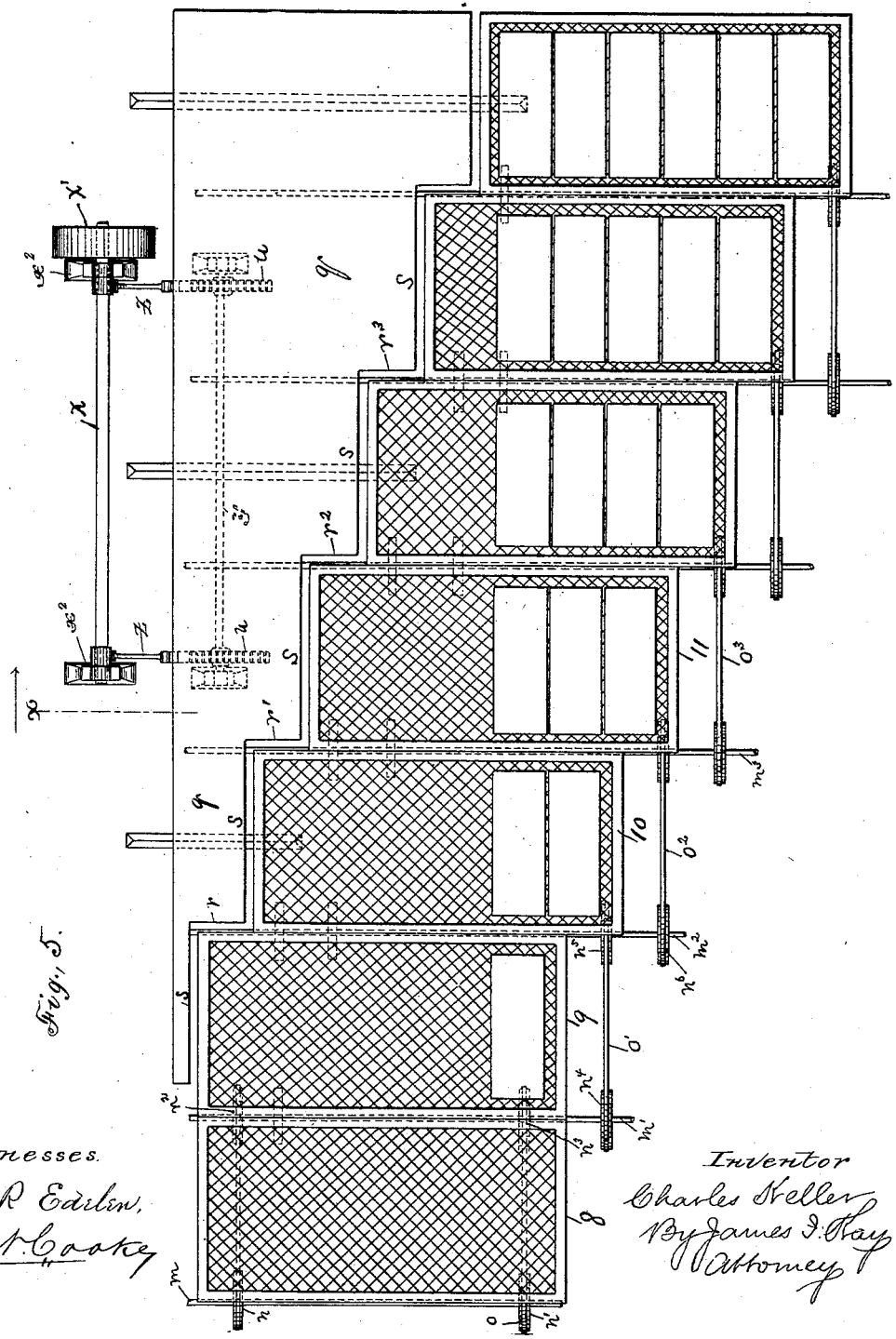

Figure 1 is a side view of my improved apparatus; Fig. 2, a plan view. Fig. 3 is an enlarged view of the carriers, showing manner of driving same. Fig. 4 is an end view; Fig. 5, a plan view of the drying-nets; and Fig. 6 is a view of the cutter for removing the first sheet from the top of the block of glue.

Like letters and figures indicate like parts.

The apparatus may be supported on any suitable frame A, composed of the side beams A' and end beams $A^2$, the said frame resting for support on the standards $A^3$. The carriers 1 2 3 4 5, &c., according to the length of the apparatus, are arranged at suitable intervals apart, the one in front of the other, in the frame A. I will first describe the construction of said carriers and the manner in which they are driven. The main power-shaft $a$ is preferably situated at about the mid-point of the apparatus, in order that power may be distributed more equally from said power-shaft as the central source of power to the preceding and succeeding carriers of the series. The main power-shaft $a$ is journaled in the side beams A' of the frame A, with the large driving-pulley $a'$ secured thereto and driven by the belt $a^2$. A sprocket-wheel $a^3$ is secured to the shaft $a$, and from said sprocket-wheel $a^3$ a chain belt $a^4$ passes around a sprocket-wheel $b'$ on the shaft $b$ of the preceding carrier 3, said shaft $b$ being likewise journaled in the side beams A'. On the inner end of the shaft $a$ is secured the sprocket-wheel $a^5$, from which the chain belt $a^6$ passes to the sprocket-wheel $c'$ of the shaft $c$ of the next succeeding carrier 5. By thus connecting the sprocket-wheel on one end of a shaft with the sprocket-wheel of the preceding shaft and the sprocket-wheel on the opposite end of the first-mentioned shaft with the sprocket-wheel of the next succeeding shaft, and so on throughout the series, all the carriers will be driven at an even and uniform speed. The carriers themselves consist of the wide belt or apron $d$, passing around the roller $d'$, forming part of the driving-shaft, and thence around a roller $d^2$ in advance of said roller $d'$, the apron $d$ being drawn sufficiently taut to support without sagging the weight of the block of glue supported thereon, or traveling over a platform extending under the apron and giving support thereto. The roller $d^2$ is journaled in the hangers $d^3$, said hangers being secured to screw-bars $d^4$, passing through a threaded seat in the frame, whereby upon the turning of the hand-wheels $d^5$ said roll may be raised or lowered a certain extent. For purposes more fully hereinafter set forth the roller $d^2$ is supported at a point slightly below the roller $d'$. Near the forward end of each carrier and supported by the frame A are the housings $e$, said housings being provided with the vertical guide-slots $e'$. Within the guide-slots $e'$ the vertical slide-bearings $e^2$ are adjusted, said bearings supporting the roller $e^3$, which may be adjusted at different heights within the housings $e$ and held thereat by any suitable locking device, as $e^4$.

Journaled in the frame A, above the roller $d^2$, is the small roller $f$, adapted to rotate in the opposite direction from the movement of the carriers and to depress the sheet cut from the block of glue to lower said sheet onto the drying-nets. For purposes of illustration this roller $f$ will be termed the "depressing-roller" to distinguish it from the feeding-rollers $f'$ $f^2$. These feeding-rollers $f'$ $f^2$ are journaled in the frame A at points just beyond the depressing-roller $f$ and are adapted to be driven in the same direction as the carriers, thus acting to feed the glue block from one carrier to the next succeeding one. A series of cross-wires $g$ is arranged to extend from a point above the roller $d^2$ to a point beyond and above the depressing-roller $f$, said wires being arranged the one slightly above and beyond the preceding one, the series of wires forming a slight incline up which the glue block may travel on its way to the succeeding carrier, while it serves to separate the cut sheet from the block. The cutting-wire $h$ is preferably situated directly below the roller $e^3$, the pressure exerted by said roller upon the glue block acting to insure an even cut and a sheet of equal thickness throughout its length. Journaled in the frame A, below the roller $d^2$, are the guide-rollers $i$ $i'$ for directing the sheet as it is cut down onto the drying-nets.

In Fig. 3 of the drawings I have illustrated a convenient manner of connecting up the several rollers for driving the same in the proper directions. In this figure I have illustrated two carriers 3 and 4, and in connection with carrier 3 I have illustrated the manner in which the rollers are driven on the inner side of each carrier, and in connection with carrier 4 the manner in which they are driven on the outer side of each carrier. Power is transmitted from the roller $d'$ to the roller $e^3$ by means of the belt $j$, said belt completely encircling the said roller $e^3$ and passing thence down under the depressing-roller $f$, thence up over the forward feed-roller $f^2$, thence down and under the guide-roller $i$, whereby said rollers are driven in the directions indicated by the arrows. In order to drive the lower guide-roller $i'$ in the proper direction, a belt $k$ passes around the inner end of the roller $e^3$, as illustrated in the carrier 3, Fig. 3, whence said belt $k$ passes over the depressing-roller $f$ and down around the lower guide-roller $i'$, crossing itself, as at $k'$, thereby driving the said guide-roller $i'$ in the opposite direction from the roller $e^3$, as indicated by the arrow. Any other suitable manner of driving the several rollers in the directions indicated may, however, be employed.

The table $l$ for the support of the drying-nets is supported beneath the carriers, and upon said table rest the drying-nets 8 9 10 11, &c., said drying-nets being constructed in the form of trays adapted to slide over the said table.

To provide for the longitudinal movement of the drying-nets, in order that the sheets of glue as they are cut from the block will arrange themselves in line with each other upon the different nets, a series of cross-shafts $m$ $m'$ $m^2$, &c., are journaled in suitable bearings below the table $l$, said cross-shafts $m$ $m'$ $m^2$, &c., having the pulleys $n$ $n'$ $n^2$, &c., secured thereto. The first cross-shaft $m$ is the power-shaft, the pulleys of the several other shafts of the series being connected up to said power-shaft $m$ by means of belts $o$ $o'$ $o^2$, &c., as shown in Fig. 5, the outer pulley $n'$ on the shaft $m$ being connected to the pulley $n^3$, in line therewith, on the shaft $m'$ by the belt $o$, the outer pulley $n^4$ on the shaft $m'$ being connected to the pulley $n^5$, directly in line therewith, on the shaft $m^2$, and so on throughout the series. The belts $o$ $o'$ $o^2$, &c., are provided with the cross-bars $p$, adapted to engage with the drying-nets 8 9 10, &c., to move them forward over the table $l$, said cross-bars being secured to said belts at such distance apart that upon one revolution of said pulleys $n$ $n'$ $n^2$, &c., the said drying-nets will be advanced a distance equal to their length. In this manner provision is made for feeding forward each net as it receives a sheet of glue. In order to impart a lateral movement to said drying-nets after the laying of each glue sheet thereon to provide for the distribution side by side of the sheets as they are cut upon said nets, a pusher or reciprocating frame $q$ is formed with a series of gradations or steps $r$ $r'$ $r^2$, &c., thereon, the spaces $s$ between the several steps corresponding to the width of the drying-nets. The pusher $q$ is mounted on the guide-frame $t$ and is adapted to travel across said guide-frame $t$. For this purpose the bottom face of the pusher $q$ is provided with the racks $u$, with which the toothed segments $u'$ engage, said toothed segments being journaled on the shaft $y$ in standards $v$. Springs $w$ are secured to the toothed segments $u'$ and to the floor or foundation upon which the apparatus rests. A driving-wheel $x'$ is mounted on the shaft $x$, journaled in suitable bearings $x^2$. The arms $z$ are secured to the shaft $x$, said arms having the toothed segments $z'$ formed on the ends thereof, adapted upon the rotation of the shaft $x$ to engage the toothed segments $u'$, said segments $u'$ in turn engaging the racks $u$ to feed the pusher $q$ across the table, thereby expanding the springs $w$ until the teeth of the segments $z'$ have passed the teeth of the segments $u'$, when upon the contraction of the springs $w$ to their normal state the pusher $q$ will resume its original position.

In order to bring the glue blocks taken from the coolers to the proper height for feeding to the machine, I prefer to arrange at the forward end of the machine a carrier 15, with a cutting-wire 16 at the proper height to cut from the top surface any surplus of thickness, this sheet so cut being waste and may be carried off in any suitable way, as shown in Fig. 6.

In the operation of cutting and spreading glue by the employment of my improved apparatus the block of glue is taken from the mold or cooler and placed upon the carrier 15 and cut to the desired thickness by the wire 16, and it then passes to the carrier 17, whence it passes to the carrier 1, a drying net or tray 8 having been placed on the table $l$ ready to be carried forward to receive the first sheet cut from the block of glue. Power is then applied to drive the power-shafts $a$, $m$, and $x$. Upon the rotation of the shaft $a$ the carriers 1 2 3, &c., through the connections hereinbefore described, will all be driven forward in the same direction. The block of glue on the carrier 1 will advance in the direction of the cutting-wire $h$, adjusted at such a height as to cut a sheet of the desired thickness from the lower face of said glue block, the roller $e^3$ traveling in the opposite direction and acting to bear upon the top face of said block with sufficient pressure to prevent any upward movement of the block during the cutting operation, thus insuring a sheet of uniform thickness. In this manner the block, together with the sheet cut therefrom, are fed forward, both following the same course until the depressing-roller $f$ is reached. As said roller $f$ rotates in the opposite direction from the direction in which the block is traveling, the action of said roller will be to depress or separate the sheet from the block, causing said sheet to be directed downward in its course underneath said roller $f$, over the guide-rollers $i$ $i'$, to the drying-net below ready to receive it. The main block, however, will continue to travel forward over the depressing-roller $f$ and onto the feeding-rollers $f'$ $f^2$, moving in the same direction as said block and carrying the same on to the next succeeding carrier 2. Meanwhile the drying-net 8 has been advancing at the same rate of speed as the carriers, the cross-bars $p$ on the belt $o$ engaging with the drying-net 8 and acting to drive it forward at a uniform rate of speed, the movement of said drying-net being so regulated that the sheet cut from the block and fed over the rollers $i$ $i'$ will spread itself upon the drying-net. Since, therefore, the carrier and drying-net advance at a uniform speed, the sheet will not be cut and fed to the drying-net so rapidly as to cause said sheet to roll or bend over on itself, but will arrange itself flat upon the net, so that when the cutting-wire $h$ has finished its work and the block of glue is passing on to the next carrier the drying-net will continue to move until it has passed to a point beyond the guide-rollers $i$ $i'$, when the entire sheet will have been spread out on the drying-net. In this manner one sheet of glue has been spread out on the drying-net 8 and the block has passed on to the next carrier 2. Each succeeding roller $e^3$ is adjusted in its housings at a lower height than the preceding one, in order that the roller $e^3$ will always be in contact with the block or glue. In this manner each succeeding roller is brought closer to the cutting-wire, as shown in Fig. 1. The drying-net 8, carrying the first sheet cut, will be under the carrier, and before said drying-net is carried forward to receive the next sheet to be cut by the cutting-wire of the carrier 2 it is apparent that in order that said sheet may arrange itself by the side of the first sheet already spread out on the drying-net it will be necessary for the drying-net 8 to move across the table a sufficient distance to permit of this arrangement of the second sheet beside the first with a suitable space between. It is therefore at this stage of the operation, just after the cutting and spreading of each sheet, that the pusher $q$ comes into play. The shaft $x$ is rotated at such a rate of speed as to cause the arms $z$ to make one complete revolution for every sheet cut, the arms $z$ being so arranged that the toothed segments $z'$ thereof will engage with the toothed segments $u'$ just as each sheet is cut, said segments $u'$ engaging the racks $u$, and thereby feeding the pusher $q$ across the frame of the apparatus, and consequently the drying-nets in contact with the spaces $s$ between the several gradations $r$ $r'$ $r^2$, &c. The segments $z'$ are provided with only enough teeth to engage the segments $u'$ for a length of time sufficient to feed the drying-nets across the table the required distance to allow for the spreading of another sheet alongside the sheet or sheets already cut. In order not to interfere with the free forward movement of the drying-nets after the said nets have been moved across the table, the springs $w$ return to their contracted or normal state and retain the pusher $q$ in position to prevent its several gradations $r$ $r'$ $r^2$, &c., from interfering with the progress of the drying-nets until the drying-nets have been advanced to receive another sheet, when the toothed segments $z'$, having made another complete revolution, will feed the pusher $q$ again across the table with the same result as before stated. The first block having passed on to the carrier 2 a second sheet is cut from the lower face thereof in the same manner as before, said sheet following the same course as the first sheet cut and arranging itself beside the first sheet cut, the drying-net 8 having been moved across the table in the manner described. The second block in the meantime has been placed on the carrier 1, while a second drying-net 9 is also added to the table, a sheet being cut in the same manner from said second block. In this manner by continually feeding new blocks of glue and drying-nets to the apparatus the work of cutting and laying the glue is automatically performed, the drying-nets moving laterally across the table after each sheet has been cut and spread, the result being, as shown in Fig. 5, that the most advanced drying-net, having been filled, is ready to be carried away to the drying-kilns, while the others follow in rapid succession. Some suitable form of carrier may be provided to convey the drying-nets as they are filled to the drying-kilns, the whole apparatus requiring much less labor and time than that heretofore employed.

For the cutting of glue sheets of the ordinary thickness I find that it generally takes about eighteen cuts from the block, and as the frame of the machine must be supported at intervals and as the nets can be conveniently arranged to hold six sheets I generally arrange the machine with three of the pushers, each adapted to push six of the nets, and arrange to feed the nets to the machine at three points, it therefore only requiring three men to feed the nets to the machine. It requires one man to feed, and the filled nets may be taken away from the nets by two men, so that the number of hands employed in operating the machine are but few.

What I claim as my invention, and desire to secure by Letters Patent, is—

1. In an apparatus for cutting glue, the combination of a traveling carrier, a wire in such position as to cut a sheet from the top of the glue block and bring it to the desired thickness, and a cutting-wire back of said cutting-wire and close to a traveling carrier supporting the block to cut a sheet from the lower end of the glue block, substantially as and for the purposes set forth.

2. In apparatus for cutting glue, the combination of a traveling carrier, and a cutting-wire close to the same to cut a sheet from the lower face of the glue block, and a depressing-roller rotating in the opposite direction to the movement of said glue block to force such sheet down from the glue block as it is fed forward, substantially as and for the purposes set forth.

3. In apparatus for cutting glue, the combination of two or more traveling carriers having cutting-wires close to the same and feeding-rollers between said carriers to carry the glue block from one carrier to the next, substantially as and for the purposes set forth.

4. In apparatus for cutting glue, the combination of two or more traveling carriers having cutting-wires close to the upper surfaces thereof, a depressing-roller traveling in an opposite direction to the course of the glue, and one or more feeding-rollers traveling in the same direction as the glue block and adapted to feed it from one carrier to the next, substantially as and for the purposes set forth.

5. In apparatus for cutting glue, the combination of a series of traveling aprons or pulleys mounted on suitable sheaves, each of said aprons being driven from the forward sheave, a cutting-wire extending across above the apron, and adjusting-bearings for the rear roller of each apron to adjust the same, according to the thickness of the glue sheet to be cut, substantially as and for the purposes set forth.

6. In apparatus for cutting glue, the combination of a traveling apron to carry the glue block, a stationary wire extending across above said apron, and a power-driven roller above the wire, traveling in the direction of the glue block to assist in feeding the same, said power-driven roller being mounted on sliding bearings providing for the adjustment of the same with relation to the cutting-wire, substantially as and for the purposes set forth.

7. In apparatus for cutting glue, the combination of a traveling apron and a cutting-wire extending across and above the same, a depressing-roller traveling in the opposite direction to the course of the glue sheet, and a net under the apron, traveling at the same speed as the apron, to receive the glue sheet therefrom, substantially as and for the purposes set forth.

8. In apparatus for cutting glue, the combination of an endless traveling apron, a cutting-wire extending across and above the same, a depressing-roller extending across and above the sheet to the under surface of the block, guiding-rollers under and back of the endless apron, and a net under the apron, traveling at the same speed as the apron, to receive the glue sheet, substantially as and for the purposes set forth.

9. In apparatus for cutting glue, the combination of two or more traveling carriers having cutting-wires close to the same to cut a sheet from the lower surface of the glue block, and a series of drying-nets corresponding to the traveling carriers and extending under the same and adapted to receive the glue sheets therefrom, and pushing mechanism to feed forward the series of drying-nets, substantially as and for the purposes set forth.

10. In apparatus for cutting glue, the combination of a series of drying-nets, a pushing apparatus to feed the same forward, and a transverse pushing apparatus to feed the same crosswise to bring other surfaces of the nets into position to receive the glue sheets, substantially as and for the purposes set forth.

11. In apparatus for cutting glue, the combination, with a series of drying-nets arranged in a step-by-step position, of mechanism for feeding said drying-nets forward and a reciprocating transverse pusher having a series of steps to engage with the several nets.

12. In apparatus for cutting glue, the combination, with a series of drying-nets arranged in a step-by-step position, of mechanism for feeding said drying-nets forward, a reciprocating transverse pusher having a series of steps adapted to engage with said nets, and mechanism for normally holding said pusher away from said nets, substantially as and for the purposes set forth.

13. In apparatus for cutting glue, the combination, with the frame, of the pusher $q$, the rack $u$, the toothed segment $u'$, engaging said rack, the spring $w$, and the arm $z$, having the toothed segment $z'$, adapted upon the revolution of the shaft $y'$ to engage the toothed segment $u'$ to operate the pusher, substantially as and for the purposes set forth.

In testimony whereof I, the said CHARLES KELLER, have hereunto set my hand.

CHARLES KELLER.

Witnesses:
J. N. COOKE,
ROBT. D. TOTTEN.